A. A. WEIGEL.
ANTIFRICTION BEARING.
APPLICATION FILED JAN. 20, 1910.
1,010,710.
Patented Dec. 5, 1911.
2 SHEETS—SHEET 1.
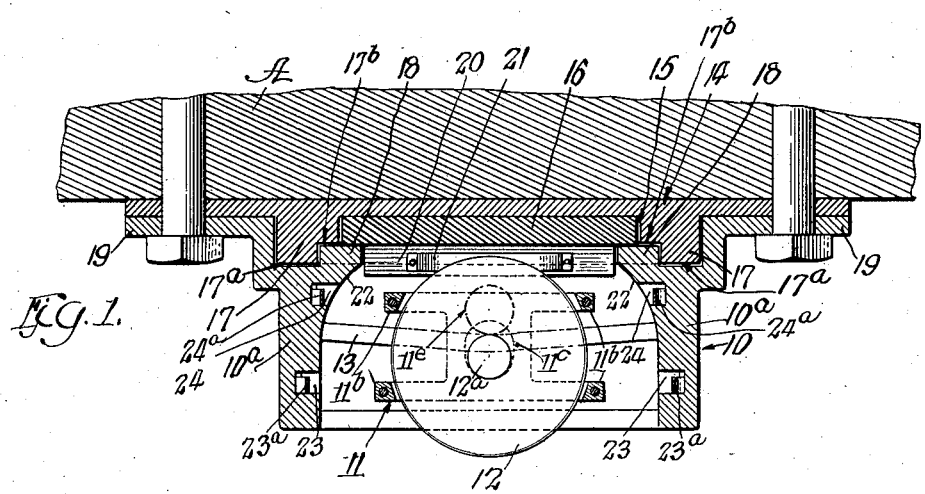
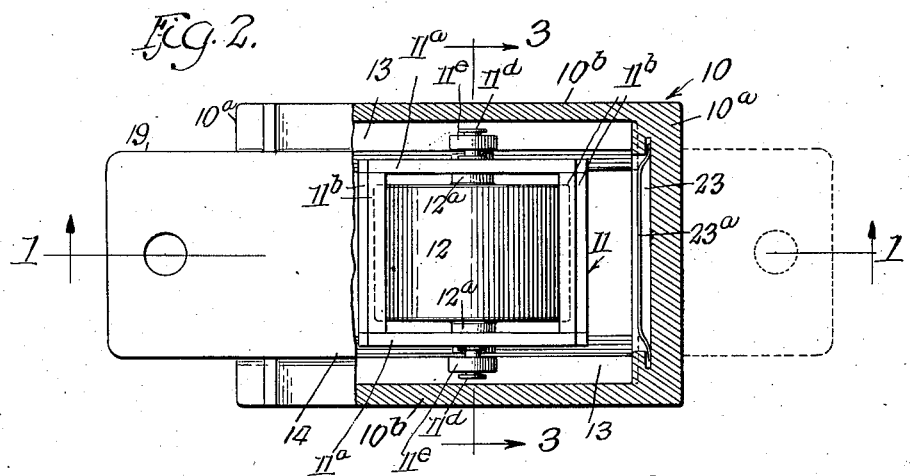
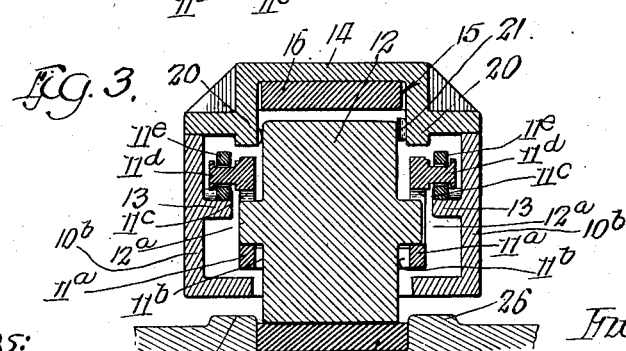

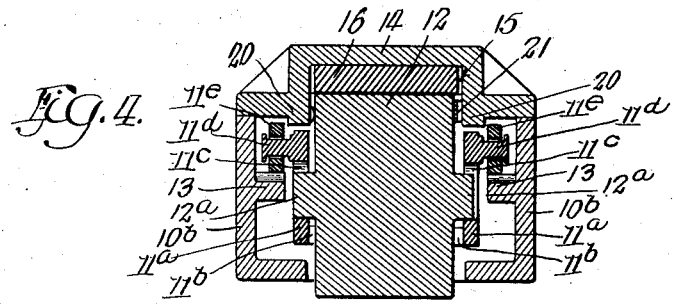
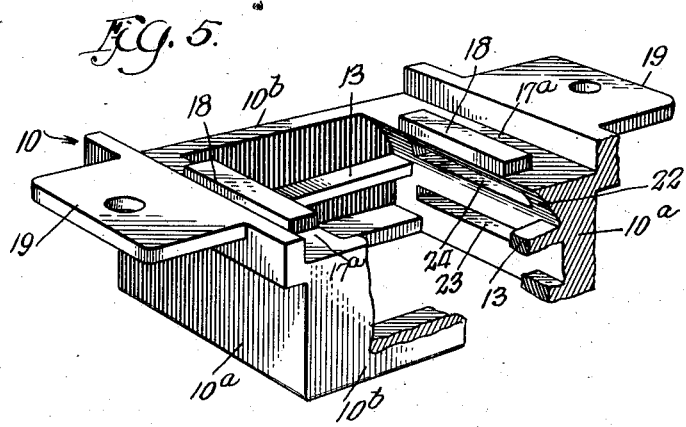
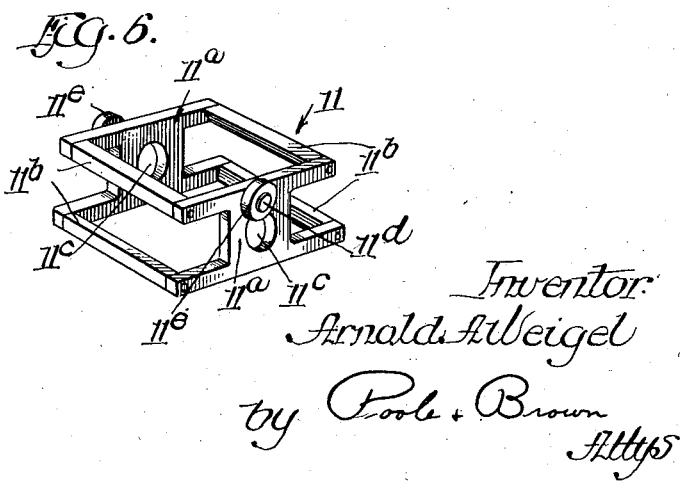

UNITED STATES PATENT OFFICE.

ARNOLD A. WEIGEL, OF CHICAGO, ILLINOIS, ASSIGNOR TO EDWIN S. WOODS, OF CHICAGO, ILLINOIS.

ANTIFRICTION-BEARING.

1,010,710.      Specification of Letters Patent.      Patented Dec. 5, 1911.

Application filed January 20, 1910. Serial No. 539,002.

*To all whom it may concern:*

Be it known that I, ARNOLD A. WEIGEL, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention relates to an improvement in antifriction bearings and more particularly to such bearings as are known as side bearings.

The invention consists in the combination of elements hereinafter described and more particularly pointed out in the appended claims.

In the drawings:—Figure 1 is a vertical longitudinal section through my improved antifriction bearing. Fig. 2 is a top plan view of the same with the top plates of the carrier or casing partially broken away. Fig. 3 is a transverse section through Fig. 2 on the line 3—3 thereof. Fig. 4 is a similar sectional view. Fig. 5 is a perspective view of the casing or carrier with part of one wall broken away to show the interior. Fig. 6 is a perspective view of the cage which immediately supports the antifriction elements.

In the drawings, 10 indicates the casing or carrier which incloses the antifriction member and by means of which the bearing is secured to the body bolster of the car in the usual manner.

11 indicates a cage which immediately supports the antifriction element and is itself supported, as presently will appear, within the carrier or casing.

12 indicates the antifriction member which is in the form of a roller provided on its opposite sides with trunnions $12^a$, $12^a$ which have bearing in the cage 11. The cage comprises end plates $11^a$, $11^a$, which are roughly in the form of the letter I, and spacing bars $11^b$, $11^b$ which are connected to the extremities of the end plates by rivets. Said spacing bars are just sufficiently long to accommodate the length of the roller 12. The end plates $11^a$ are provided with elongated slots or openings $11^c$, $11^c$ which are adapted to receive the roller trunnions $12^a$, $12^a$ and to permit said roller to have free up and down play within the cage. At the upper ends of the end plates are provided laterally extending studs $11^d$, $11^d$, upon which are mounted small rollers or disks $11^e$, $11^e$ by means of which the cage is suspended within the carrier or casing.

13, 13 indicate tracks formed on the side walls of the casing 10 and extending longitudinally thereof. Said tracks are adapted to support the rollers or disks $11^e$, $11^e$ and are inclined downwardly toward the middle of the casing so that the cage 11 will tend always to roll toward the center of the casing when free to do so. By this construction the roller is not only free to move in the cage but also with the cage. The points of contact of the roller with the bearing plates are thus constantly changed.

The casing 10 comprises end walls $10^a$, $10^a$, side walls $10^b$, $10^b$, and is open at the top and bottom. The roller projects through the opening in the bottom in the usual manner. The top is closed by a plate 14 which is provided with a recess 15 adapted to receive a wear plate 16. Said top plate is provided with transversely arranged, depending ribs 17, 17 which engage in similarly arranged grooves $17^a$, $17^a$ formed at each end of the casing. Running parallel to said grooves and forming one wall thereof are transversely extending ribs 18, 18 formed on the casing which engage under shoulders $17^b$, $17^b$ formed in the ribs 17, 17 of the top plate. Said ribs 18, 18 also underlie and support the ends of the wear plate 16 which is retained in place against them by the top plate 14.

The casing is provided at each end with flanges 19, 19 by means of which it may be secured to the car body bolster. Said flanges also serve to secure the casing to the car body bolster A, as indicated in Fig. 1. The parts are retained in position by simply bolting the flanges 19, 19 and the ends of the top plate 14 to the car bolster, as indicated in Fig. 1. The top plate is also provided with longitudinally running, parallel ribs 20, 20 arranged at each side of the path of the roller. Said ribs form the side walls of the recess 15 and also guide rails for the top of the roller to prevent it from wabbling.

Arranged on one side of the casing and secured to the inner face of one of the ribs 20 is a flat leaf spring 21, which is adapted to engage the side face of the roller, as clearly to be seen in Figs. 2 and 3. When the side bearing is placed in position that side of it on which the spring is located is turned away from the center of the car truck. When the car body turns with reference to the truck, this spring by its engagement with the face of the roller, prevents said roller from being forced against the outer wall of the casing and thus grinding and producing a disagreeable noise. In addition, when the roller is released after engaging contact with its upper and lower bearing surfaces and it returns to the center, it is engaged by the spring which prevents it from rattling in its casing, and prevents loose movement of the roller in the casing when not engaged between both bearing surfaces.

The inner faces of the end walls of the casing are curved near the top, as indicated at 22, to fit the surface of the roller when it reaches the end of the casing. Channels 23, 24 are provided in the end walls and in these are located leaf springs 23$^a$, 24$^a$ which are adapted to be struck by the spacing bars of the cage at the limit of its path of movement so as to be compressed and then by expansion to give the cage an initial movement on its return to the center.

In Fig. 3 I have indicated a novel arrangement of the wear plate on the truck bolster. The truck bolster is provided with a channel 25 which contains said wear plate 25$^a$ and at each side of the channel are located longitudinally extending shoulders or ribs 26, 26 which project above the surface of the wear plate in position to engage the sides of the roller and thus keep it to its path. It will thus be seen that while in my improved bearing the roller has a great deal of freedom of movement, at the same time, the direction of this movement is in a fairly definite path.

To assemble the structure, the roller is placed with its trunnions in holes or openings 11$^c$, 11$^c$ of the end plates and the rods 11$^b$ then secured to said end plates. The cage carrying the roller is then inserted through the top of the casing or carrier and the top plate 14 is then applied.

I have shown herein one embodiment of my invention, but it is apparent that the mechanical details of construction shown therein may be variously modified without departing from the spirit of my invention, and I, therefore, do not wish to be limited to them except as pointed out in the appended claims.

I claim as my invention:—

1. In an antifriction bearing, in combination with a suspension member, an antifriction element, a cage or carrier from which said antifriction element is suspended, said antifriction element having limited movement independent of said carrier, and means for suspending said carrier in said suspension member adapted to permit its free movement up or down or endwise of said suspension member.

2. In an antifriction device, a suspension member, tracks carried by said suspension member, a cage or carrier adapted to be suspended from said suspension member, said cage or carrier being provided with rollers adapted to ride on said tracks, and an antifriction member suspended within said cage or carrier and having limited independent movement with respect thereto.

3. In an antifriction device, a suspension chamber provided with tracks, a cage or carrier adapted to be suspended within said suspension chamber, rollers journaled on said cage or carrier adapted to ride on said tracks, an antifriction member having trunnions suspended within said casing or carrier and having limited independent movement with respect thereto.

4. In an antifriction device, a suspension member provided with tracks, a cage or carrier adapted to be suspended from said suspension member, rollers journaled on said cage or carrier adapted to rest or roll on said tracks, said rollers and tracks being constructed so that said cage or carrier will normally gravitate toward a predetermined point, and an antifriction member suspended within said cage or carrier.

5. In an antifriction bearing, in combination with a suspension member, an antifriction element, a cage or carrier from which said antifriction element is suspended, said antifriction element having limited movement independent of said carrier, means for suspending said carrier in said suspension member adapted to permit its free movement up or down or endwise of said suspension member, and means adapted to return said cage or carrier to a predetermined point where said antifriction member is free to move with said cage or carrier.

6. In an antifriction device, a suspension chamber provided with tracks, said tracks being inclined from each end toward the center of the chamber, a cage or carrier adapted to be suspended within said chamber and provided with rollers adapted to rest and roll on said tracks, and an antifriction member suspended within said cage or carrier and having independent movement with respect thereto.

7. In an antifriction device, a suspension chamber provided with tracks, a cage or carrier adapted to be suspended within said chamber, said cage or carrier comprising end plates and spacing bars secured to said plates, rollers journaled on said end plates adapted to rest or roll on said tracks, openings formed in said end plates below said rollers, and an antifriction member provided with trunnions, said trunnions bearing within said openings in the end plates of said cage or carrier.

8. In an antifriction bearing, in combination with a chamber having a side wall, an antifriction member located in said chamber, and resilient means located intermediate the side wall of said chamber and said antifriction member adapted to engage said antifriction member at a predetermined position in its path.

9. In an antifriction bearing, in combination with a suspension member and an antifriction member suspended within said chamber, resilient means located in said casing intermediate the side wall thereof and said antifriction member adapted to prevent said antifriction member from grinding against the side wall of said casing.

10. In an antifriction bearing, in combination with a suspension member and an antifriction roller suspended in said casing, a depending rib in said casing adapted to form one side of the path of said roller, and resilient means interposed between said rib and said roller adapted to engage said roller when said roller is at a predetermined position.

11. In an antifriction bearing, in combination with a suspension chamber having side walls and being provided with tracks, a cage or carrier adapted to be suspended within said suspension chamber, rollers provided on said cage or carrier adapted to rest and roll on said tracks, an antifriction member suspended within said casing or carrier and having movement with respect thereto, and resilient means interposed between a side wall of said chamber and the end of said antifriction member adapted to engage said antifriction member at a predetermined point.

12. In an antifriction bearing, a suspension chamber open at top and bottom and provided with end walls and side walls, transverse grooves formed in the tops of the end walls, attaching ears formed on said end wall, a top plate adapted to close the top of said casing, said top plate being provided with a recess and with depending, transverse ribs adapted to engage in the transverse grooves of the casing, a year plate located in said recess adapted to be retained in position by said top plate, and projections formed on said top plate at each end adapted to engage said attaching ears.

In testimony, that I, claim the foregoing as my invention I affix my signature in the presence of two witnesses, this 31st day of December A. D. 1909.

ARNOLD A. WEIGEL.

Witnesses:
T. H. ALFREDS,
G. R. WILKINS.

---

Copies of this patent may be obtained for five cents each, by addressing the "Commissioner of Patents, Washington, D. C."